United States Patent
Enke

(10) Patent No.: US 10,589,734 B2
(45) Date of Patent: Mar. 17, 2020

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventor: Martin Enke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 302 days.

(21) Appl. No.: 15/560,168

(22) PCT Filed: Mar. 24, 2016

(86) PCT No.: PCT/EP2016/056648
§ 371 (c)(1),
(2) Date: Sep. 21, 2017

(87) PCT Pub. No.: WO2016/156245
PCT Pub. Date: Oct. 6, 2016

(65) Prior Publication Data
US 2018/0086335 A1    Mar. 29, 2018

(30) Foreign Application Priority Data
Mar. 31, 2015   (DE) .................. 10 2015 004 118

(51) Int. Cl.
*B60W 20/40*     (2016.01)
*B60W 10/02*     (2006.01)
(Continued)

(52) U.S. Cl.
CPC ............ *B60W 20/40* (2013.01); *B60K 6/485* (2013.01); *B60K 6/54* (2013.01); *B60W 10/02* (2013.01);
(Continued)

(58) Field of Classification Search
CPC .............................................. B60W 30/18072
See application file for complete search history.

(56) References Cited

U.S. PATENT DOCUMENTS

| 4,842,113 A | * | 6/1989 | Lutz | ............... B60W 10/06 477/73 |
| 6,022,295 A | | 2/2000 | Liu | |
(Continued)

FOREIGN PATENT DOCUMENTS

| CN | 1256216 A | 6/2000 |
| DE | 3204651 C1 | 8/1983 |
(Continued)

OTHER PUBLICATIONS

Examination Report dated Dec. 15, 2015 of corresponding German application No. 10 2015 004 118.5; 6 pgs.
(Continued)

*Primary Examiner* — Derek D Knight
(74) *Attorney, Agent, or Firm* — Maier & Maier, PLLC

(57) ABSTRACT

A method for operating a drive device for a motor vehicle. The drive device has an internal combustion engine, an output shaft, and a clutch connected between the internal combustion engine and the output shaft. In a coasting operating mode, an idling speed control of the internal combustion engine to an idling speed is carried out and the clutch is opened, and, in an overrun operating mode, the clutch is closed. When shifting from the coasting operating mode to the overrun operating mode, while, at the same time, carrying out the idling speed control of the internal combustion engine to the idling speed, the clutch is closed, so that an entrainment of the internal combustion engine occurs.

10 Claims, 1 Drawing Sheet

(51) Int. Cl.
    *B60W 10/06*    (2006.01)
    *B60W 30/18*    (2012.01)
    *B60K 6/485*    (2007.10)
    *B60K 6/54*     (2007.10)

(52) U.S. Cl.
    CPC ...... *B60W 10/06* (2013.01); *B60W 30/18072* (2013.01); *B60W 30/18136* (2013.01); *B60W 2030/1809* (2013.01); *B60W 2030/18081* (2013.01); *B60W 2510/0638* (2013.01); *B60W 2510/1015* (2013.01); *B60W 2510/18* (2013.01); *B60W 2540/12* (2013.01); *B60W 2710/022* (2013.01); *B60W 2710/065* (2013.01); *B60W 2710/0627* (2013.01); *B60Y 2200/92* (2013.01); *Y02T 10/6226* (2013.01); *Y02T 10/76* (2013.01); *Y10S 903/915* (2013.01); *Y10S 903/93* (2013.01); *Y10S 903/946* (2013.01)

(56) References Cited

U.S. PATENT DOCUMENTS

| | | |
|---|---|---|
| 9,421,971 B2 | 8/2016 | Dornieden et al. |
| 2014/0067214 A1 | 3/2014 | Ruebsam et al. |

FOREIGN PATENT DOCUMENTS

| | | |
|---|---|---|
| DE | 3208715 A1 | 9/1983 |
| DE | 4321413 A1 | 1/1995 |
| DE | 19805459 A1 | 8/1998 |
| DE | 102009055922 A1 | 6/2011 |
| DE | 102010061383 A1 | 6/2012 |
| DE | 102011109353 A1 | 9/2012 |
| DE | 10 2012 013 689 A1 | 1/2014 |
| DE | 10 2012 015 291 A1 | 2/2014 |
| DE | 102013210266 A1 | 12/2014 |
| DE | 102013219007 A1 | 3/2015 |

OTHER PUBLICATIONS

International Search Report dated May 30, 2016 of corresponding International application No. PCT/EP2016/056648; 11 pgs.
Office Action dated Oct. 5, 2018 in corresponding German Application No. 10 2015 004 118.5; 14 pages including a partial machine generated English-language translation.
International Preliminary Report on Patentability dated Oct. 12, 2017 of corresponding International application No. PCT/EP2016/056648; 9 pgs.
Office Action dated Jun. 24, 2019 in corresponding Chinese Application No. 201680020036.3; 18 pages including English-language translation.
Office Action dated Oct. 30, 2019 in corresponding Chinese Application No. 201680020036.3; 8 pages.

\* cited by examiner

METHOD FOR OPERATING A DRIVE DEVICE FOR A MOTOR VEHICLE AND CORRESPONDING DRIVE DEVICE

FIELD

The invention relates to a method for operating a drive device for a motor vehicle, wherein the drive device has an internal combustion engine, an output shaft, and a clutch connected between the internal combustion engine and the output shaft and wherein, in a coasting operating mode, an idling control of the internal combustion engine to an idling speed is carried out and the clutch is opened, and, in an overrun operating mode, the clutch is closed. The invention further relates to a drive device.

BACKGROUND

The drive device serves, for example, for driving the motor vehicle and therefore for supplying a torque directed at driving the motor vehicle, which can also be referred to as a drive torque. For supplying the drive torque, the drive device has at least one drive assembly, such as, for example, the internal combustion engine. Obviously, the drive device can also have a plurality of drive assemblies, which preferably differ from one another, and in this respect can be designed as a hybrid drive device. In this case, for example, a first of the drive assemblies is an internal combustion engine and a second of the drive assemblies is an electric motor.

The drive device has the output shaft, at which the drive torque supplied by the at least one drive assembly, in particular the internal combustion engine, is applied. Preferably a transmission is operatively connected to the output shaft, in particular rigidly and/or permanently. By means of the clutch connected between the internal combustion engine and the output shaft, it is possible selectively either to decouple the output shaft and consequently the transmission from the internal combustion engine or to connect them operatively to the internal combustion engine. The transmission is preferably a shift transmission, by means of which different gear ratios can be adjusted, in particular a manual transmission. The clutch is, for example, a starting clutch.

It can thus be provided that the output shaft is on the side of the transmission facing away from the internal combustion engine or is a component of the transmission and is therefore in operative connection between a transmission input shaft and a transmission output shaft of the transmission. In the first case, the output shaft is, for example, a transmission output shaft. The transmission input shaft of the transmission is preferably operatively connected to the internal combustion engine, in particular rigidly and/or permanently. It can be provided that the clutch is integrated in the transmission and thus forms a component of it and in this respect is arranged in the operative connection between the transmission input shaft and the transmission output shaft. In particular, the transmission is designed as an automatic transmission or automatic shift transmission or as an automated manual transmission. The clutch is, for example, a multi-plate clutch or the like.

In order to ensure an energy-efficient operation of the motor vehicle that is as optimal as possible and correspondingly as little fuel consumption of the internal combustion engine as possible, the drive device can be operated in the so-called coasting operating mode. In this operating mode, the clutch is opened, in particular completely opened, so that the internal combustion engine is completely decoupled from the output shaft. At the same time, the idling speed control of the internal combustion engine is carried out, in which the current rotational speed of the internal combustion engine is controlled to the idling speed. The idling speed is preferably chosen to be as low as possible, but such that a further operation of the internal combustion engine is ensured and thus an inadvertent standstill is prevented. The latter may occur, for example, when the speed of the internal combustion engine drops too far below the idling speed.

The coasting operating mode is conducted, in particular when there is no torque demand, for example, by a user of the motor vehicle and/or a driver assist device. Torque demand is understood to mean a demand placed on the drive device to bring about either an acceleration or a deceleration of the motor vehicle and correspondingly to supply a drive torque that differs from zero at the output shaft. Besides the coasting operating mode, the drive device can be operated in the overrun operating mode. In this operating mode, the clutch is to be closed, preferably completely closed. At the same time, a drive torque, in particular a drive torque that is less than 0 Nm, directed at decelerating the motor vehicle, is supplied to the output shaft by means of the drive device. Such a drive torque is produced, for example, by means of friction present in the internal combustion engine and/or by corresponding actuation of gas exchange valves.

If the drive device is then operated in the coasting operating mode and a torque demand that is directed at deceleration of the motor vehicle arises, it is necessary to switch from the coasting operating mode to the overrun operating mode. To this end, for example, it is possible to adjust and, in particular, to control the speed of the internal combustion engine by means of a corresponding control to a transmission speed of the transmission. For this purpose, the amount of fuel introduced into the internal combustion engine is increased, so that the speed of the internal combustion engine, starting from the idling speed, is increased in the direction of the transmission speed. Once the internal combustion engine speed has attained the transmission speed, that is, corresponds to it, the clutch is completely closed. However, such an operating procedure is energy-consuming or necessitates an increased fuel consumption.

SUMMARY OF THE DISCLOSURE

The object of the invention is now to propose a method for operating a drive device for a motor vehicle that has advantages in comparison to the prior art, in particular an extremely energy-efficient shifting from the coasting operating mode to the overrun operating mode.

This is achieved in accordance with the invention by closing the clutch when shifting from the coasting operating mode to the overrun operating mode, while, at the same time, carrying out the idling speed control of the internal combustion engine to the idling speed, so that an entrainment of the internal combustion engine occurs. It is then provided, therefore, that the idling speed control to the idling speed, which is already carried out in the coasting operating mode, is also carried on during shifting. Especially preferably, the idling speed control is carried out during the entire shifting. In addition, the clutch is closed and, in particular, only partially closed. The only partial closing of the clutch is to be understood to mean that the clutch is adjusted in such a way that the clutch torque is less than the currently existing drive torque, so that clutch slippage occurs.

Closing of the clutch results in entrainment of the internal combustion engine, so that the internal combustion engine speed is increased, in particular in the direction of the transmission speed. The transmission speed corresponds, in particular, to an output shaft speed and thus to the speed of the output shaft. Obviously, a potentially existing gear ratio between the internal combustion engine and the output shaft needs to be taken into account. This is the case, for example, when the output shaft is a component of the transmission or is on the side of the transmission facing away from the internal combustion engine. The speed of the internal combustion engine is thus adjusted in the direction of the transmission speed that is subject to the gear ratio and, in particular, is increased. For example, it is provided in this case that the clutch is adjusted to a specific clutch torque. In this case, the clutch torque defines the torque that can be transmitted or is transmitted between the internal combustion engine and the output shaft by means of the clutch. For example, a control of the internal combustion engine speed in the direction of or to the transmission speed is carried out, with the clutch torque serving as the adjusted variable.

Alternatively, it can be provided that the speed of the internal combustion engine is changed over time in the direction of the transmission speed by use of a constant speed gradient of the internal combustion engine and, in particular, is increased. In this case, it is possible, for example, to carry out a control to the specific internal combustion engine speed gradient, with, once again, the clutch torque being employed as the adjusted variable. Here, too, it is preferably provided that the clutch is completely closed once the internal combustion engine speed corresponds to the transmission speed.

During the entraining of the internal combustion engine, the speed of the internal combustion engine increases in the direction of transmission speed. This is dictated by the idling speed control, which controls the internal combustion engine speed in the direction of the idling speed. Serving as adjusted variable of the idling speed control is, for example, the amount of fuel fed to the internal combustion engine per unit of time. The more clearly the speed of the internal combustion engine exceeds the idling speed, the more the idling speed control reduces the amount of fuel per unit of time that is fed to the internal combustion engine. This results not only in the advantage that no additional fuel needs to be employed for the acceleration of the internal combustion engine, but even more that the fuel consumption during shifting drops below the fuel consumption that is expended for the idling operating mode of the internal combustion engine.

It can be provided that the shifting is carried out in accordance with the above discussion only in a first operating mode; that is, the clutch is closed in the first operating mode, while the idling speed control of the internal combustion engine is carried out. In contrast, in a second operating mode, for example, as explained in the introduction, the clutch is initially kept open and the internal combustion engine speed is controlled to the transmission speed by increasing the injected amount of fuel. In the second operating mode, the clutch is then closed only when the speed of the internal combustion engine corresponds to the transmission speed. In the process, the clutch is preferably abruptly closed.

Preferably, it is provided that the first operating mode is carried out when an anticipated frictional work of the clutch is less than the limit value of the frictional work and/or an anticipated frictional energy of the clutch is less than a limit value of the frictional energy. The anticipated frictional work and the anticipated frictional energy are determined, for example, directly prior to the shifting, in particular from the transmission speed, from the internal combustion engine speed, and/or from a gear ratio adjusted at the transmission.

In a preferred embodiment of the invention, it is provided that, in a first step, the clutch is only partially closed. The first step is carried out immediately at the start of the shifting from the coasting operating mode to the overrun operating mode. During this time, the clutch is only partially closed. In this way, it is possible to increase the internal combustion engine speed smoothly in the direction of the transmission speed. In this case, for example, a control in accordance with the above discussion is carried out, with the internal combustion engine speed being controlled in the direction of the transmission speed, and the clutch torque, or a clutch variable that influences the clutch torque and, in particular, directly influences the clutch torque, serving as an adjusted variable. The clutch variable is, for example, a hydraulic pressure of the clutch that influences the clutch torque. Alternatively, it can be a current and/or a voltage of a valve, in particular a hydraulic valve, of the clutch, by means of which preferably the hydraulic pressure is adjusted or controlled. In parallel to this, however, the idling speed control is continued. This likewise controls the internal combustion engine speed, albeit in the direction of the idling speed, with the amount of fuel being used as the adjusted variable.

In another embodiment of the invention, it is provided that, in a second step, the clutch is completely closed when an internal combustion engine speed corresponds to a transmission speed of a transmission of the drive device. Reference hereto has already been made above. The transmission is a component of the drive device and is operatively connected to the output shaft, preferably rigidly and/or permanently. The transmission speed is understood to mean the speed (rpm) of the transmission on the side of the transmission facing the internal combustion engine. In particular, the transmission speed corresponds to the speed of the output shaft and consequently to the output shaft speed. Once the internal combustion engine speed has attained the transmission speed, the second step is carried out, and correspondingly the clutch is completely closed. This is understood to mean that the clutch is adjusted in such a way that there is no longer any clutch slippage.

Another embodiment of the invention provides that the shifting is terminated once the internal combustion engine speed corresponds to the transmission speed. The time course during shifting is as follows: First of all, the coasting operating mode is engaged up to a specific first point in time. At this first time point, the shift from the coasting operating mode to the overrun operating mode is initiated and carried out up to a second time point, which is different from the first time point. Immediately after the second time point, the shifting is terminated. Consequently, the overrun operating mode is present.

In another preferred embodiment of the invention, it can be provided that a fuel injection into the internal combustion engine with increasing internal combustion engine speed is reduced. As already explained, the idling speed control of the internal combustion engine to the idling speed occurs during shifting from the coasting operating mode to the overrun operating mode. Because the idling speed is less that the transmission speed to which the internal combustion engine speed is to be brought, the idling speed control will attempt to prevent the increase in the internal combustion engine speed or to change it again in the direction of the idling speed. Accordingly, the idling speed control reduces the amount of fuel introduced into the internal combustion engine per unit of time, so that, overall, the fuel consumption during shifting can be markedly reduced.

An enhancement of the invention provides that the fuel injection is suspended when the internal combustion engine speed has exceeded a threshold speed of the internal combustion engine. If the internal combustion engine speed has attained or exceeded the internal combustion engine threshold speed, it can be assumed that, also when the clutch is opened and there is an abrupt drop in the internal combustion engine speed in the direction of a standstill of the internal combustion engine, sufficient time remains to resume the fuel injection in order to prevent the internal combustion engine from shutting down, and, in particular, in order to keep the internal combustion engine speed at least at the idling speed.

The threshold speed of the internal combustion engine is therefore preferably chosen to be greater than the idling speed; in particular, it amounts to at least 125%, at least 150%, at least 175%, or at least 200% of the idling speed. Suspension of the fuel injection is preferably understood to mean that the amount of fuel introduced into the internal combustion engine per unit of time is equal to zero; that is, the fuel injection is completely interrupted.

In another embodiment of the invention, it is provided that the threshold speed of the internal combustion engine is chosen to be less than the transmission speed. The internal combustion engine threshold speed can be set at the factory, for example, to be constant. Alternatively, however, it can also be determined dynamically on the basis of the transmission speed. In particular, it is chosen to be less than the latter, so that, overall, the internal combustion engine threshold speed is greater than the idling speed, but less than the currently existing transmission speed.

A preferred enhancement of the invention provides that shifting from the coasting operating mode to the overrun operating mode occurs when an operating brake of the motor vehicle is actuated. In the introduction, it was already explained that the coasting operating mode is primarily used in order to lower the fuel consumption in appropriate operating states of the motor vehicle by decoupling the internal combustion engine from the output shaft. The overrun operating mode, in contrast, serves to decelerate the motor vehicle by supplying a drive torque directed at such a deceleration. It is desirable in this respect to initiate the overrun operating mode as soon as the operating brake is actuated.

Such an actuation can be effected, for example, by the driver of the motor vehicle and/or by a driver assist device. It can be provided that any actuation of the operating brake is sufficient to engage the shifting. Alternatively, the shifting can also be carried out only when the deceleration predetermined by the actuation of the operating brake is greater than a deceleration threshold value.

Finally, it can be provided in another embodiment of the invention that shifting from the overrun operating mode to an idling operating mode is carried out when the transmission speed goes below a transmission threshold speed, with the clutch being completely open in the idling operating mode. In the overrun operating mode, the speed of the motor vehicle and consequently the speed of the internal combustion engine are reduced. If this occurs to the desired extent, then the idling operating mode can be initiated. In this idling operating mode, the clutch is completely opened and the idling speed control of the internal combustion engine to the idling speed is carried out as already explained above.

Preferably, the idling operating mode is initiated or the shifting from the overrun operating mode to the idling operating mode is carried out when the transmission speed goes below the transmission threshold speed. In this case, the transmission threshold speed is chosen in such a way, for example, that it corresponds to the idling speed or amounts to at most 105%, at most 110%, at most 115%, at most 120%, or at most 125% of the idling speed.

The invention further relates to a drive device for a motor vehicle, in particular for implementation of the above-described method, having an internal combustion engine, an output shaft, and a clutch connected between the internal combustion engine and the output shaft, wherein, in a coasting operating mode, an idling speed control of the internal combustion engine to an idling speed is carried out and the clutch is opened and, in an overrun operating mode, the clutch is closed. It is hereby provided that the drive device is designed so as to close the clutch when shifting from the coasting operating mode to the overrun operating mode occurs, while, at the same time, the idling speed control of the internal combustion engine to the idling speed is carried out, so that an entrainment of the internal combustion engine occurs.

Reference has already been made to the advantages of such a procedure or to such an embodiment of the drive device. Both the drive device and the corresponding method can be developed further in accordance with the above discussion, so that reference is made in this respect to said discussion.

BRIEF DESCRIPTION OF THE DRAWINGS

The invention will be explained in detail below on the basis of the exemplary embodiments illustrated in the drawing, without any limitation of the invention. Shown are.

DETAILED DESCRIPTION OF THE DRAWINGS

Figure 1:
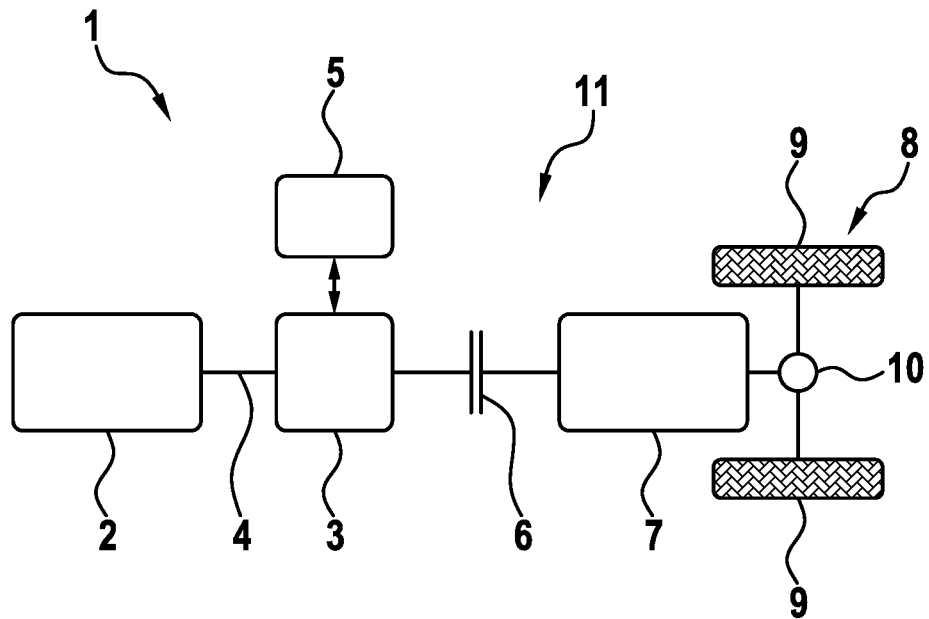
FIG. 1 a schematic illustration of a section of a motor vehicle.

FIG. 1 shows a schematic illustration of a drive device 1 for a motor vehicle, for example, which, in the embodiment illustrated here, is a hybrid drive device. Accordingly, the drive device 1 has at least two drive assemblies, namely, a first drive assembly 2 and a second drive assembly 3. The first drive assembly 2 is present, for example, in the form of an internal combustion engine, the second drive assembly 3 as an electric motor.

The two drive assemblies 2 and 3 can be operatively connected to each other via a shaft 4 in a rigid and/or permanent manner. However, the shaft 4 can also be associated with a separating clutch, by means of which the operative connection between the drive assemblies 2 and 3 can be interrupted. The second drive assembly 3 or the electric motor is actuated by means of a power electronics unit 5, which is actuated on its side, for example, by use of a control unit.

In addition, the drive device 1 has a clutch 6, in particular a starting clutch, as well as a transmission 7, in particular a shift transmission. The transmission 7 is operatively connected or at least can be operatively connected to the internal combustion engine 2 via the clutch 6. It is noted that the illustration chosen here is purely by way of example. The transmission 7 can be designed as a manual transmission, an automatic transmission, or as an automated manual transmission, in particular as a multiple clutch transmission, such as, for example, a dual clutch transmission. In particular, in the case of the automatic transmission or the automated manual transmission, the clutch 6 can be a component of the transmission 7.

Further illustrated is an axle 8, which, in the exemplary embodiment illustrated here, is associated with two wheels 9. The axle 8 or the wheels 9 are preferably operatively connected, in particular rigidly and/or permanently, connected to the transmission 7 via an axle differential gearbox 10. Accordingly, the axle 8 or the wheels 9 can be driven by means of the internal combustion engine 2 and/or the electric motor 3. The drive device 1, together with the axle 8, the wheels 9, and the axle differential gearbox 10, can form a drive train 11 for the motor vehicle.

The drive device 1 can then be operated at least in a coasting operating mode and in an overrun operating mode. In the coasting operating mode, an idling speed control of the internal combustion engine 2 to an idling speed is carried out. At the same time, the clutch 6 is opened. In an overrun operating mode, in contrast, the clutch 6 is closed, in particular completely closed, so that, via the clutch 6 and the transmission 7, a drive torque of the internal combustion engine 2 directed at deceleration of the motor vehicle can be applied to the axle 8 or the wheels 9.

If the coasting operating mode is then to be switched to the overrun operating mode, the clutch 6 is closed, while, at the same time, the idling speed control of the internal combustion engine 2 is carried out. The closing of the clutch 6 results in an entrainment of the internal combustion engine 2. Because the idling speed control attempts to keep the internal combustion engine speed of the internal combustion engine 2 at the idling speed, it will reduce the amount of fuel per unit of time, which serves as the adjusted variable, and is fed to the internal combustion engine 2, with increasing internal combustion engine speed. Consequently, a marked fuel savings results from this procedure.

Figure 2:
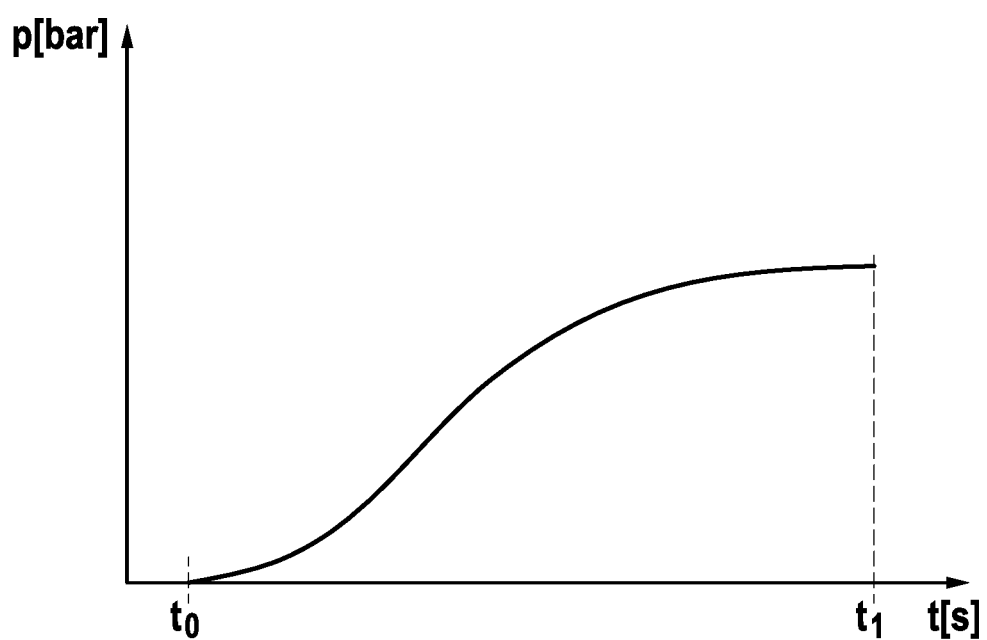
FIG. 2 a diagram in which a clutch pressure is plotted over time.

FIG. 2 shows a diagram in which a clutch pressure p of the shifting clutch 6 is plotted over the time t. For $t<t_0$, the drive device is in its coasting operating mode. From the point in time $t=t_0$ on, the shifting from the coasting operating mode to the overrun operating mode occurs, with the latter operating mode being present for $t>t_1$. The shifting is terminated at the point in time $t=t_1$, with the overrun operating mode following immediately. The clutch pressure p behaves analogously to a clutch torque, that is, to the maximum torque that can be transmitted via the clutch 6.

It is clear that the clutch pressure for $t<t_0$ is low—for example, zero. During shifting, that is, in the period of time $t_0 \leq t \leq t_1$, the clutch pressure p rises steadily. No jump in the clutch pressure p therefore occurs, as would be the case for an abrupt coupling by means of the clutch 6. Such an abrupt coupling could be carried out when the internal combustion engine 2 is brought from its own power to a transmission speed present at the transmission 7. In contrast to this, an entrainment of the internal combustion engine 2 is provided in order to reduce markedly the fuel consumption during shifting from the coasting operating mode to the overrun operating mode.

The invention claimed is:

1. A method for operating a drive device for a motor vehicle, wherein the drive device has an internal combustion engine, an output shaft, and a clutch connected between the internal combustion engine and the output shaft, and wherein, in a coasting operating mode, an idling speed control of the internal combustion engine to an idling speed is carried out and the clutch is opened and, in an overrun operating mode, the clutch is closed, wherein the clutch is closed when shifting from the coasting operating mode to the overrun operating mode, while, at the same time, carrying out the idling speed control of the internal combustion engine to the idling speed, so that an entrainment of the internal combustion engine occurs, and wherein the clutch is adjusted to a predetermined clutch torque that is transmitted between the internal combustion engine and the output shaft.

2. The method according to claim 1, wherein the clutch is only partially closed in a first step.

3. The method according to claim 2, wherein, in a second step, the clutch is completely closed when an internal combustion engine speed corresponds to a transmission speed of a transmission of the drive device.

4. The method according to claim 3, wherein the shifting is terminated as soon as the internal combustion engine speed corresponds to the transmission speed.

5. The method according to claim 1, wherein a fuel injection into the internal combustion engine is reduced with increasing internal combustion engine speed.

6. The method according to claim 5, wherein the fuel injection is suspended when the internal combustion engine speed exceeds a threshold speed of the internal combustion engine.

7. The method according to claim 3, wherein the internal combustion engine threshold speed is chosen to be less than the transmission speed.

8. The method according to claim 1, wherein the shifting from the coasting operating mode to the overrun operating mode occurs when an operating brake of the motor vehicle is actuated.

9. The method according to claim 3, wherein the shifting from the overrun operating mode to an idling operating mode occurs when the transmission speed goes below a transmission threshold speed, wherein the clutch is completely opened in the idling operating mode.

10. A drive device for a motor vehicle, comprising: an internal combustion engine, an output shaft, and a clutch connected between the internal combustion engine and the output shaft, wherein, in a coasting operating mode, an idling speed control of the internal combustion engine to an idling speed is carried out and the clutch is opened, and, in an overrun operating mode, the clutch is closed, wherein the drive device is designed to close the clutch when shifting from the coasting operating mode to the overrun operating mode, while, at the same time, carrying out the idling speed control of the internal combustion engine to the idling speed, so that an entrainment of the internal combustion engine occurs, and wherein the clutch is adjusted to a predetermined clutch torque that is transmitted between the internal combustion engine and the output shaft.

* * * * *